US012669001B2

(12) United States Patent
Takahashi et al.

(10) Patent No.: US 12,669,001 B2
(45) Date of Patent: Jun. 30, 2026

(54) DOOR LATCH DEVICE

(71) Applicants: NISSAN MOTOR CO., LTD., Yokohama (JP); MITSUI KINZOKU ACT CORPORATION, Yokohama (JP)

(72) Inventors: Kazunori Takahashi, Kanagawa (JP); Katsuhiko Taniguchi, Kanagawa (JP); Tsuyoshi Matsunaga, Kanagawa (JP); Takuya Shinohara, Kanagawa (JP)

(73) Assignees: NISSAN MOTOR CO., LTD., Yokohama (JP); HI-LEX ACT Corporation, Yokohama (JP)

(*) Notice: Subject to any disclaimer, the term of this patent is extended or adjusted under 35 U.S.C. 154(b) by 0 days.

(21) Appl. No.: 18/835,319

(22) PCT Filed: Nov. 25, 2022

(86) PCT No.: PCT/JP2022/043533

§ 371 (c)(1),
(2) Date: Aug. 1, 2024

(87) PCT Pub. No.: WO2023/149061

PCT Pub. Date: Aug. 10, 2023

(65) Prior Publication Data

US 2025/0163735 A1 May 22, 2025

(30) Foreign Application Priority Data

Feb. 3, 2022 (JP) ................................ 2022-015589

(51) Int. Cl.
*E05B 77/06* (2014.01)
*E05B 85/24* (2014.01)

(52) U.S. Cl.
CPC ........... *E05B 85/243* (2013.01); *E05B 77/06* (2013.01)

(58) Field of Classification Search
CPC .......... E05B 77/02; E05B 77/04; E05B 77/06; E05B 77/12; E05B 85/24; E05B 85/243; E05B 85/26
See application file for complete search history.

(56) References Cited

U.S. PATENT DOCUMENTS 8,764,077 B2 * 7/2014 Takagi .................. E05B 85/243 292/336.3
9,366,063 B2 * 6/2016 Rosales .................. E05B 85/26
(Continued)

FOREIGN PATENT DOCUMENTS

JP 2011-026780 A 2/2011
JP 2018-003305 A 1/2018
(Continued)

*Primary Examiner* — Kristina R Fulton
*Assistant Examiner* — Noah Horowitz
(74) *Attorney, Agent, or Firm* — Foley & Lardner LLP

(57) ABSTRACT

A door latch device includes an open link and a ratchet lever. The open link includes: a lever body; an inertia lever; and a release biasing member. Further, the inertia lever is capable of transmitting an operating force to the ratchet lever only when the door handle is opened when the lever body is disposed at the unlocked position and disposed at the operating position, and, between the lever body and the inertia lever, there are included a shifting biasing member that shifts the inertia lever to a shift position with respect to the lever body in a movement mode different from rotation that takes place when the inertia lever rotates to the sensing position and regulating members that prevent the inertia lever from moving from the shift position to the operating position across the sensing position when the inertia lever is shifted to the shift position.

5 Claims, 19 Drawing Sheets

(56) References Cited

U.S. PATENT DOCUMENTS

| | | | | |
|---|---|---|---|---|
| 9,874,046 | B2 * | 1/2018 | Wittelsbuerger | E05B 77/06 |
| 10,907,384 | B2 * | 2/2021 | Damboiu | E05B 81/42 |
| 10,934,746 | B2 * | 3/2021 | Debroucke | E05B 77/06 |
| 10,961,749 | B2 * | 3/2021 | Akagi | E05B 77/06 |
| 11,180,933 | B2 * | 11/2021 | Taga | E05B 85/02 |
| 11,608,660 | B2 * | 3/2023 | Graute | E05B 77/06 |
| 2012/0110920 | A1 | 5/2012 | Takagi et al. | |
| 2015/0240536 | A1 | 8/2015 | Cumbo | |
| 2017/0370128 | A1 | 12/2017 | Akagi et al. | |
| 2022/0154497 | A1 | 5/2022 | Taga | |
| 2022/0268062 | A1 | 8/2022 | Shinohara | |

FOREIGN PATENT DOCUMENTS

| | | | |
|---|---|---|---|
| JP | 2020-153191 | A | 9/2020 |
| WO | WO-2021/070401 | A1 | 4/2021 |

* cited by examiner

SHIFT POSITION

DOOR LATCH DEVICE

FIELD

The present disclosure relates to a door latch device.

BACKGROUND

Some of the door latch devices, which maintain a door closed with respect to a vehicle body, are configured such that the door is not opened unintentionally even when an impact force is applied to the vehicle body. For example, Patent Literature 1 discloses an open link that operates, when a door handle is opened, to release a ratchet lever, the open link including a lever body and an inertia lever. The lever body moves as the door handle is operated to open and can be displaced between an unlocked position and a locked position. The inertia lever is supported to be displaceable with respect to the lever body between the operating position and the non-operating position and is biased to be maintained at the operating position by a release biasing spring.

In this door latch device, when an impact force is applied to the vehicle due to a side collision or the like, the inertia lever moves to the non-operating position against the biasing force of the release biasing spring.

The inertia lever moved to the non-operating position is disengaged from the ratchet lever even when the lever body is moved. Therefore, in the state where the inertia lever is disposed at the non-operating position, even if the door handle moves with respect to the vehicle body due to an influence of an impact force, it is possible to prevent the door from being unintentionally opened.

CITATION LIST

Patent Literature

Patent Literature 1: Japanese Laid-open Patent Publication No. 2011-26780

SUMMARY

Technical Problem

Meanwhile, it has been confirmed that, in a case where an impact force is applied to a vehicle body due to a collision or the like, a door handle moves in an opening operation direction a plurality of times in a quite short time with respect to the vehicle body. The inertia lever of the door latch device described above returns to the operating position by the biasing force of the release biasing spring even after moving to the non-operating position. Therefore, in a case where the door handle is operated in the opening operation direction in a state where the inertia lever is returned to the operating position, there is a possibility that the door is unintentionally opened.

In view of the above circumstances, an object of the present disclosure is to provide a door latch device capable of more reliably preventing a situation in which a door is unnecessarily opened even when an impact force is applied to a vehicle body.

Solution to Problem

To attain the object, a door latch device according to the present disclosure includes: an open link that shifts between an unlocked state and a locked state and operates when a door handle is opened; and a ratchet lever that releases an engagement state of a ratchet with respect to a latch when an operation force is applied via the open link, so that, in the door latch device, the open link is capable of transmitting an operation force to the ratchet lever when the door handle is opened in the unlocked state. Further, the open link includes: a lever body that is displaced to an unlocked position corresponding to the unlocked state and a locked position corresponding to the locked state and moves with an opening operation of the door handle; an inertia lever that is movable to an operating position and a sensing position by relatively rotating with respect to the lever body about a predetermined axis; and a release biasing member that biases the inertia lever in a rotation direction such that the inertia lever is maintained at the operating position with respect to the lever body, so that the inertia lever is capable of transmitting an operating force to the ratchet lever only when the door handle is opened in a state where the lever body is disposed at the unlocked position and disposed at the operating position, and between the lever body and the inertia lever, there are included a shifting biasing member that shifts the inertia lever to a shift position with respect to the lever body in a movement mode different from rotation that takes place when the inertia lever rotates to the sensing position against a biasing force of the release biasing member and regulating members that prevent the inertia lever from moving from the shift position to the operating position across the sensing position by facing to each other along the axis when the inertia lever is shifted to the shift position by the shifting biasing member.

In the above door latch device according to the present disclosure, between the lever body and the inertia lever, there are included block portions that are included side by side along the axis when the inertia lever is disposed at the operating position, the block portions facing each other in a circumferential direction around the axis when the inertia lever is shifted to the shift position by the shifting biasing member.

In the above door latch device according to the present disclosure, the shifting biasing member biases the inertia lever in a tilting direction with respect to the lever body.

In the above door latch device according to the present disclosure, the release biasing member is a torsion spring centered at the axis, the release biasing member also functioning as the shifting biasing member.

In the above door latch device according to the present disclosure, the inertia lever and a housing accommodating the inertia lever each include a return unit that comes into contact with each other and returns the inertia lever to the operating position when the door handle is opened with a preset stroke amount for returning in a state where the inertia lever is shifted to the shift position.

Advantageous Effects of Invention

According to the present disclosure, when an inertia lever rotates to a sensing position with respect to the lever body, the inertia lever is shifted to a shift position by a shifting biasing member, and regulating members face each other along an axis, and thus the inertia lever is prevented from moving to an operating position across the sensing position. Therefore, after the inertia lever is once disposed at the sensing position, the ratchet lever does not operate even when the door handle is operated in an opening operation direction, and it is possible to more reliably prevent the door from being unintentionally opened when an impact force is applied to the vehicle body.

DESCRIPTION OF EMBODIMENTS

Hereinafter, preferred embodiments of a door latch device according to the present disclosure will be described in detail with reference to the accompanying drawings. In the following description, for convenience, each direction is specified in a state of being mounted on a vehicle.

Figure 1:
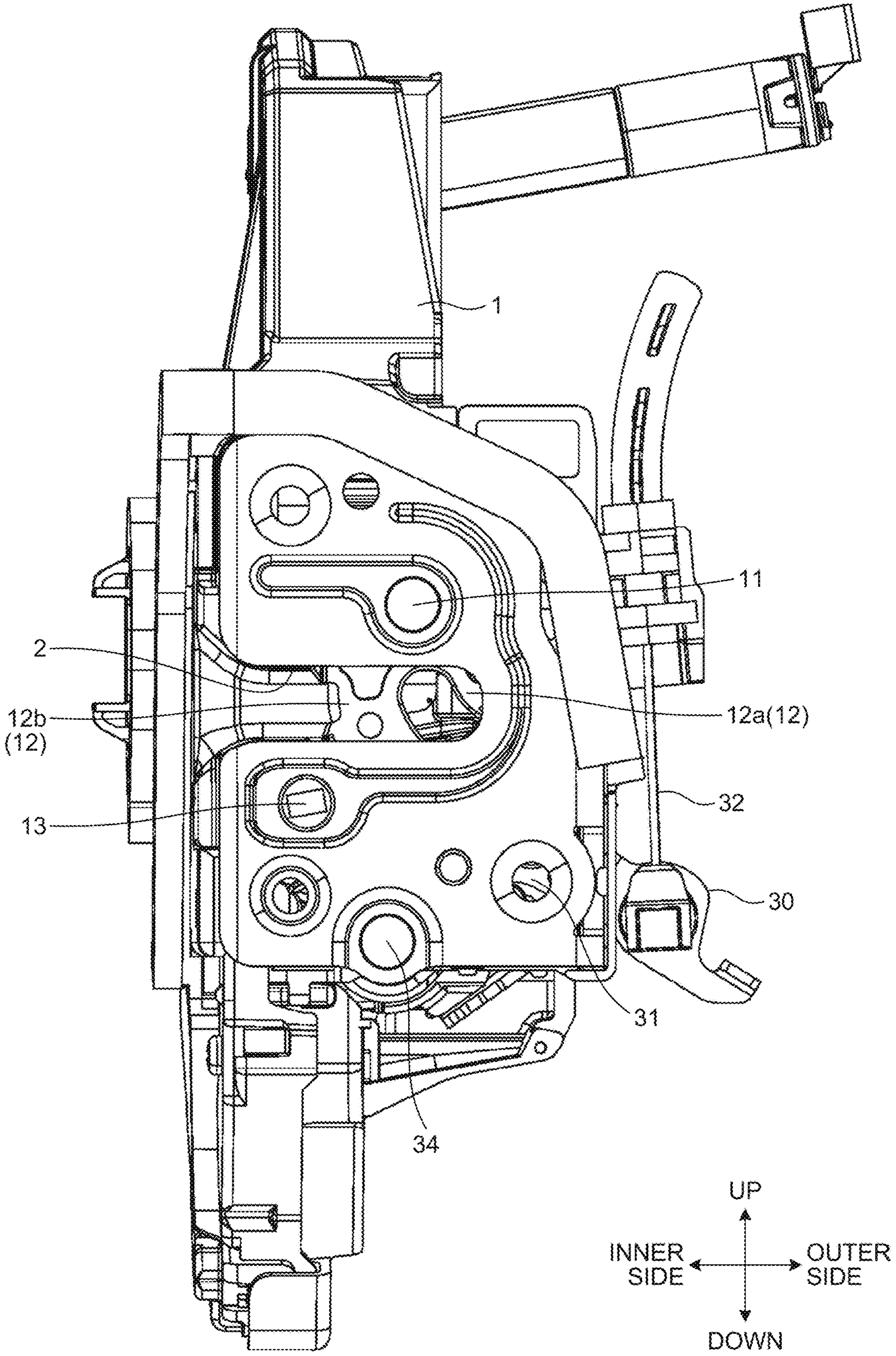
FIG. 1 is a diagram of an external appearance of a door latch device according to an embodiment of the present disclosure as viewed from a rear side of a vehicle.
Figure 2:
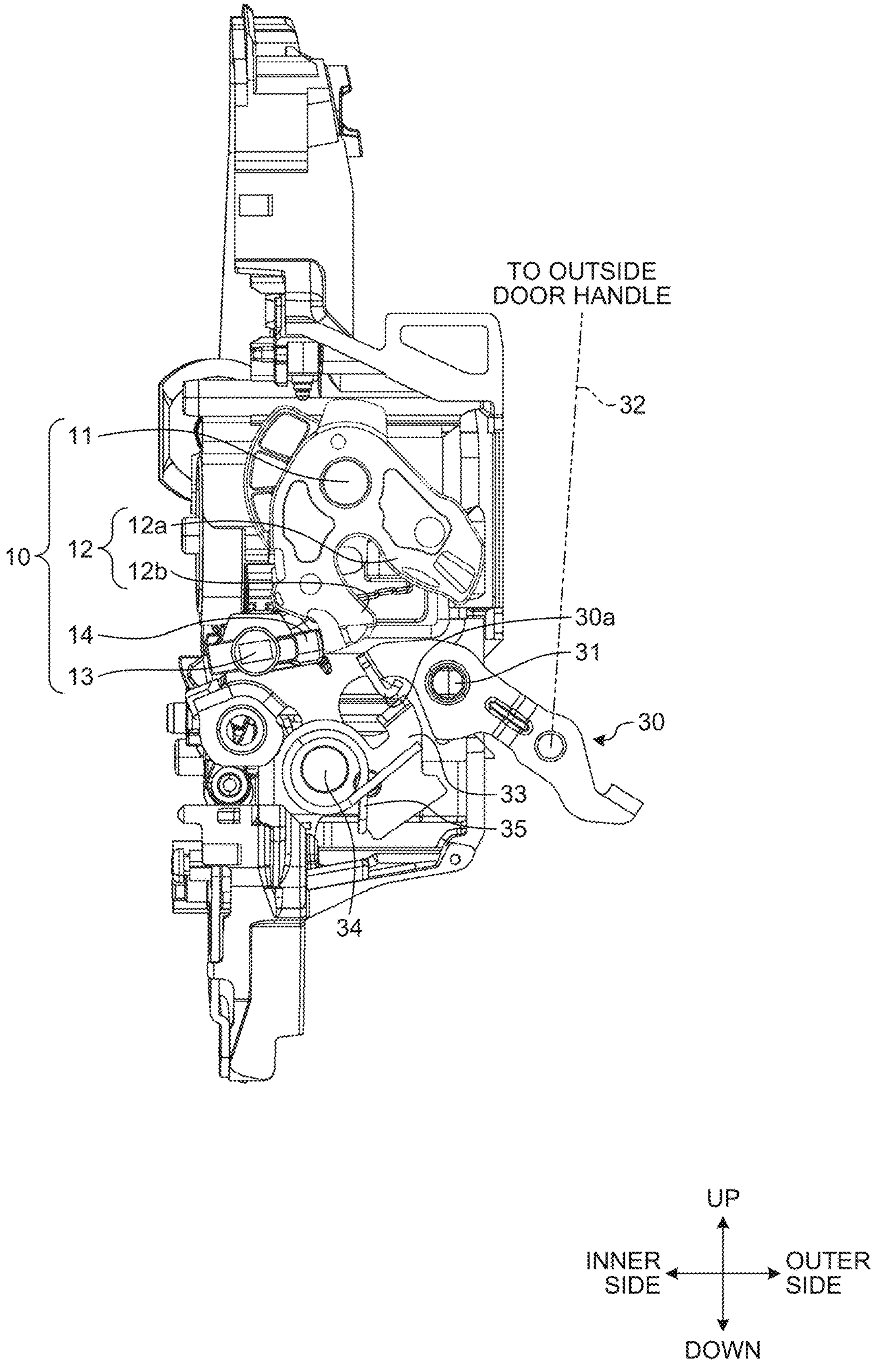
FIG. 2 is a diagram of a state in which a housing is omitted in FIG. 1.
Figure 3:
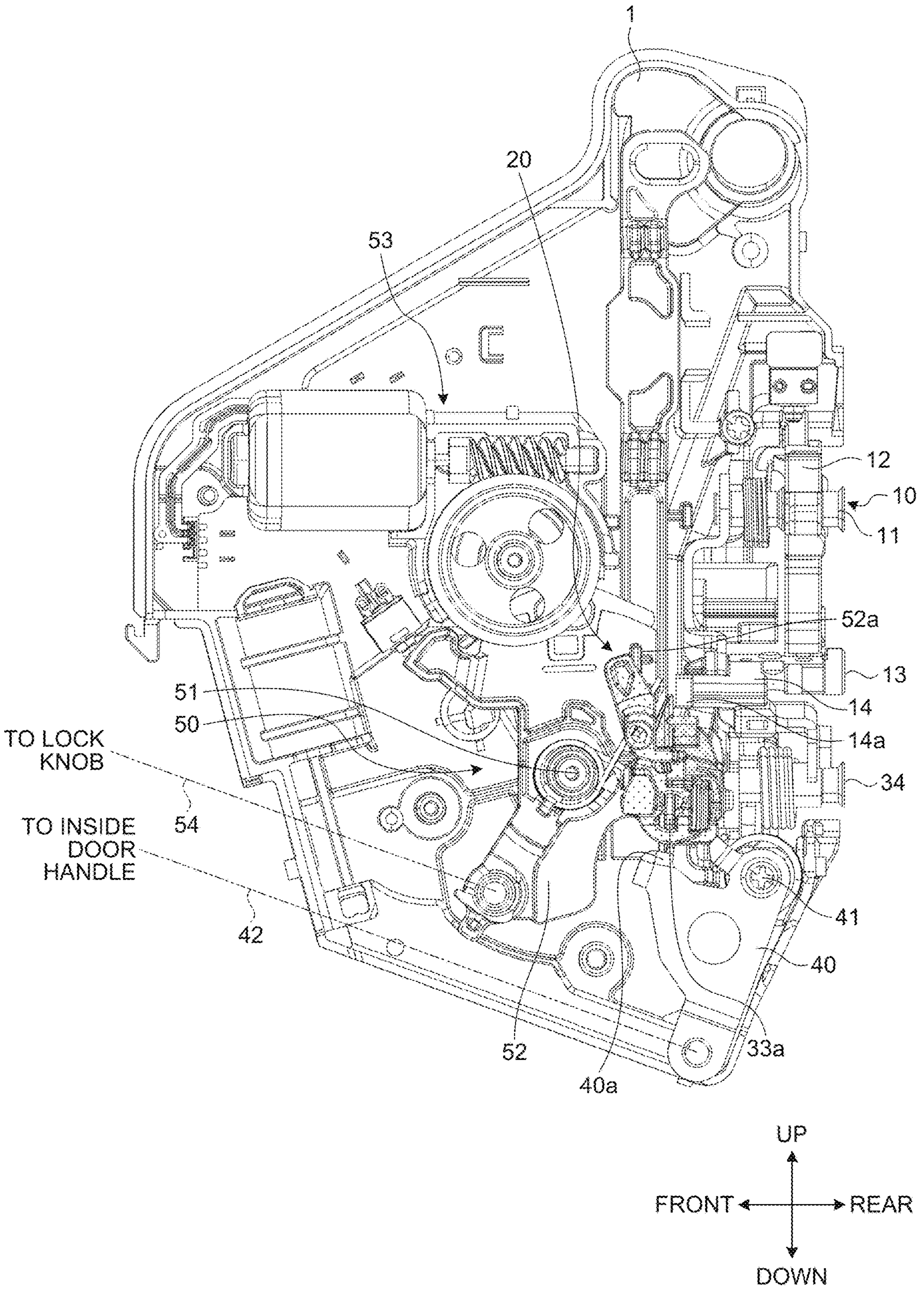
FIG. 3 is a diagram of an internal structure of the door latch device illustrated in FIG. 1 as viewed from an inner side of the vehicle.

FIGS. 1 to 3 are diagrams illustrating a door latch device according to an embodiment of the present disclosure. Although not illustrated, the door latch device described as an example here is mounted on a side door of a front hinge disposed on the right side of a four-wheeled vehicle and performs opening and closing control of the side door by changing the engagement state with a striker provided in a vehicle body in accordance with an opening operation using a door handle or a locking or unlocking operation using a key. In the door latch device, a latch unit 10 is provided inside a housing 1.

The latch unit 10 includes a latch 12 rotatably disposed via a latch shaft 11 and a ratchet 14 rotatably disposed via a ratchet shaft 13. The latch shaft 11 and the ratchet shaft 13 extend substantially horizontally along a front-rear direction of any vehicle. In the illustrated example, the latch shaft 11 is provided in a portion on the upper side of the vehicle with respect to a striker entry groove 2 included in the housing 1, and the ratchet shaft 13 is provided in a portion on the inner side of the vehicle with respect to the latch shaft 11 in a portion on the lower side of the vehicle with respect to the striker entry groove 2. A striker (not illustrated) enters the striker entry groove 2 from the left side in FIG. 1, which is relatively on the inner side of the vehicle, by a closing operation of the side door.

The latch 12 includes a striker contact portion 12*a* and a hook 12*b* and is biased in a release direction (clockwise direction in FIG. 2) by a biasing force of a latch spring (not illustrated) to be disposed in a meshing standby state. The meshing standby state is a state in which the hook 12*b* is retracted upward with respect to the striker entry groove 2 while the striker contact portion 12*a* is disposed on the back side (right side in FIG. 2) of the striker entry groove 2. When the side door is closed and the striker enters the striker entry groove 2, the striker abuts on the striker contact portion 12*a*, whereby the latch 12 rotates counterclockwise in FIG. 2 against the biasing force of the latch spring, and the hook 12*b* is disposed in a state of crossing the open end side of the striker entry groove 2.

The ratchet 14 prevents the latch 12 from rotating in the release direction by engaging with the hook 12*b* when the hook 12*b* of the latch 12 is disposed in the state of crossing the striker entry groove 2. The ratchet 14 is biased in a direction (counterclockwise direction in FIG. 2) of engaging with the latch 12 by a biasing force of a ratchet spring (not illustrated). Therefore, when the striker enters the striker entry groove 2 and the hook 12*b* of the latch 12 is disposed in such a manner as to cross the striker entry groove 2, the ratchet 14 is engaged with the hook 12*b* by the biasing force of the ratchet spring, whereby this state is maintained.

Figure 4:
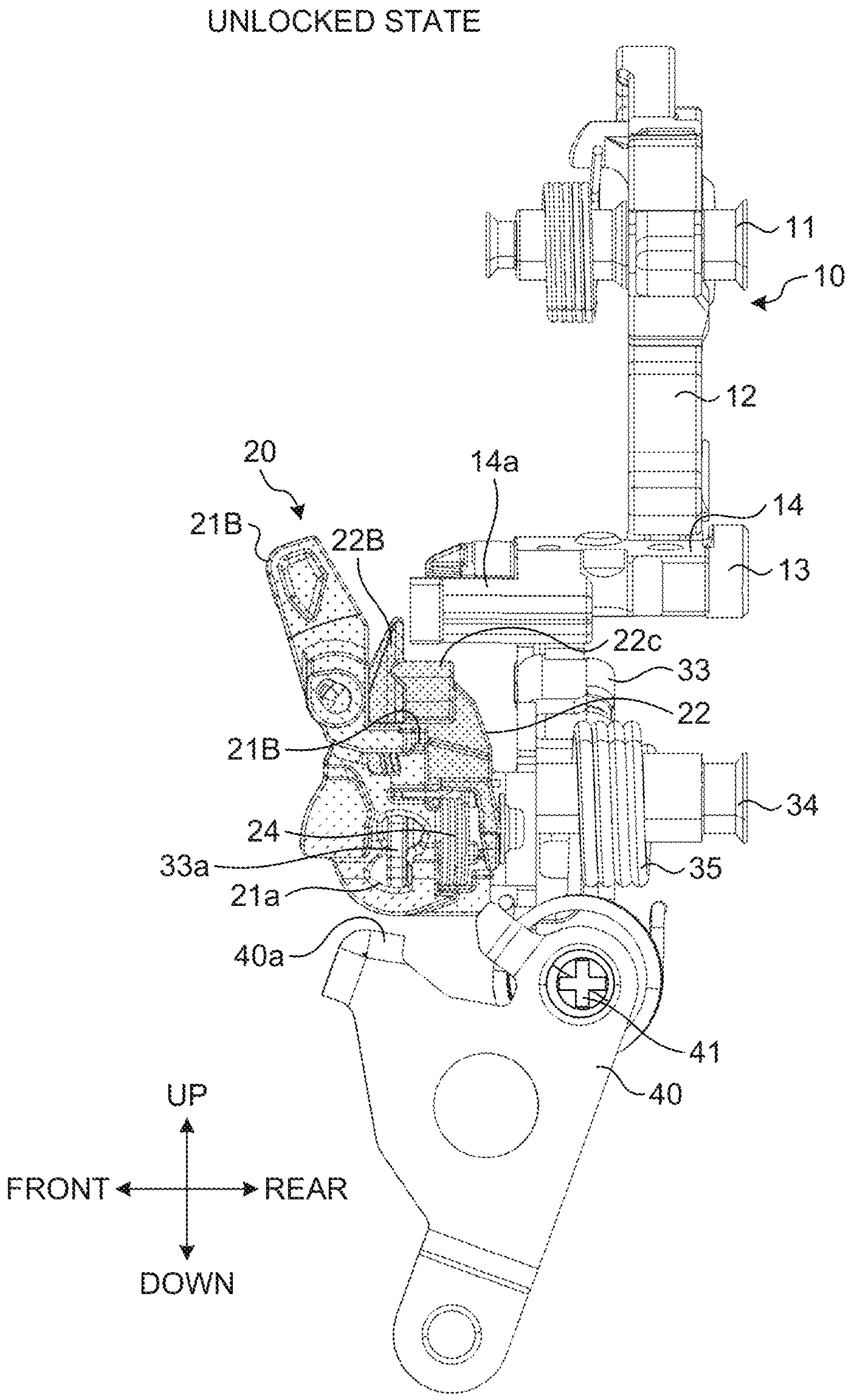
FIG. 4 is a diagram of the main part of the internal structure when the door latch device illustrated in FIG. 1 is in an unlocked state as viewed from the inner side of the vehicle.
Figure 5:
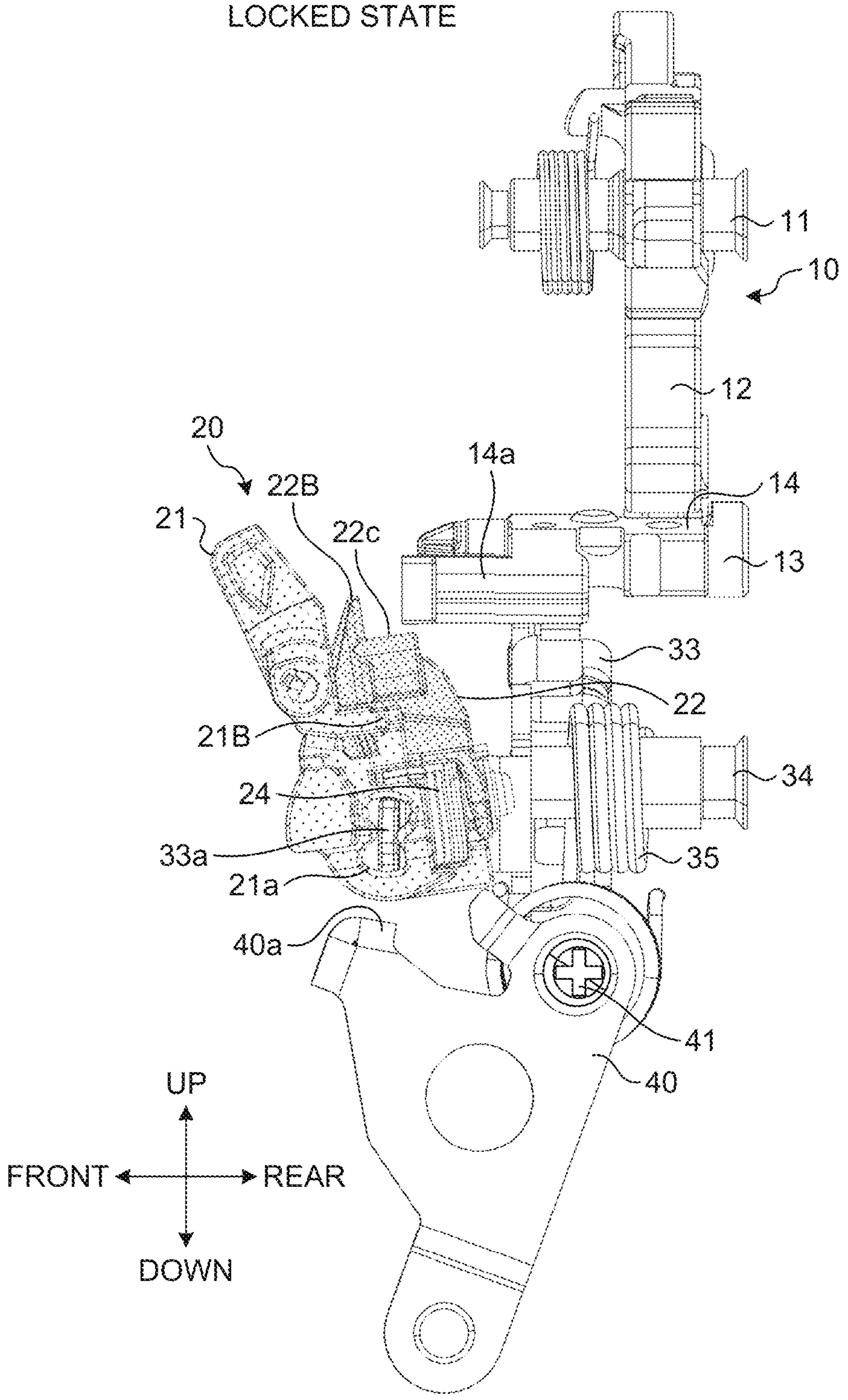
FIG. 5 is a diagram of the main part of the internal structure when the door latch device illustrated in FIG. 1 is in a locked state as viewed from the inner side of the vehicle. 15

As illustrated in FIGS. 4 and 5, a ratchet lever 14*a* is integrally provided with the ratchet 14. The ratchet lever 14*a* extends from a portion of the ratchet shaft 13 located on the front side of the vehicle with respect to the ratchet 14 towards the inner side of the vehicle. When the ratchet lever 14*a* is pressed upward against the biasing force of the ratchet spring, the ratchet 14 rotates clockwise in FIG. 2, and thus the engagement state between the ratchet 14 and the latch 12 can be released.

As illustrated in FIGS. 3 to 5, an open link 20 is disposed in a portion below the ratchet lever 14*a* inside the housing 1. The open link 20 is disposed in the housing 1 in such a manner as to be movable along the vertical direction by the operation of an outside handle lever 30 and an inside handle lever 40 and to be able to shift between the unlocked state and the locked state by being rotated about an axis in a direction along the left-right direction of the vehicle by the operation of a lock unit 50.

As illustrated in FIGS. 1 and 2, the outside handle lever 30 is disposed in a portion below the ratchet shaft 13 in a rotatable manner by an outside lever shaft 31 extending along the front-rear direction of the vehicle. Although not illustrated, an outside door handle of the side door is linked to an end of the outside handle lever 30 located on the outer side of the vehicle via an outside cable 32. An open lever 33 is disposed in such a manner as to be able to be linked to an end 30*a* of the outside handle lever 30 located on the inner side of the vehicle. The open lever 33 is disposed in a portion on the inner side of the vehicle with respect to the outside handle lever 30 and on a lower side with respect to the outside lever shaft 31 in a rotatable manner by an open lever shaft 34 extending along the front-rear direction of the vehicle, and an engagement end 33*a* located on the inner side of the vehicle is engaged with a rotation center portion (an engagement hole 21*a* to be described later) of the open link 20.

When the outside door handle is opened, the outside handle lever 30 rotates counterclockwise in FIG. 2 via the outside cable 32, the open lever 33 rotates clockwise in FIG. 2, and the open link 20 moves upward via the engagement end 33*a*. When the opening operation of the outside door handle is stopped, the open lever 33 rotates counterclockwise by a biasing force of a return spring 35, and the open link 20 and the outside handle lever 30 return to the original state.

As illustrated in FIG. 3, the inside handle lever 40 is disposed in a portion below the open link 20 in a rotatable manner by an inside lever shaft 41 extending along the left-right direction of the vehicle, and a front end 40*a* located on the front side faces a lower end surface of the open link 20. Although not illustrated, an inside door handle of the side door is linked to the lower end of the inside handle lever 40 via an inside cable 42.

When the inside door handle is opened, the inside handle lever 40 rotates clockwise in FIG. 3 via the inside cable 42, and the open link 20 moves upward via the front end 40*a* of the inside handle lever 40. At this point, the open lever 33 rotates clockwise in FIG. 2 as the open link 20 moves upward. Therefore, when the opening operation of the inside door handle is stopped, the open lever 33 rotates counterclockwise by the biasing force of the return spring 35, and the open link 20 and the inside handle lever 40 return to the original state.

As illustrated in FIG. 3, the lock unit 50 includes a lock lever 52, which rotates about the axis of a lock shaft 51 extending along the left-right direction of the vehicle, and engages with the open link 20 via an engagement piece 52*a* of the lock lever 52. The lock unit 50 includes an actuator unit 53 linked to the lock lever 52 and a lock cable 54. The actuator unit 53 is locked and unlocked by a remote controller owned by a user of the vehicle. The lock cable 54 transmits a lock operation and an unlock operation of a lock knob (not illustrated) provided on the side door to the lock lever 52.

In the lock unit 50, when the actuator unit 53 or the lock cable 54 is unlocked, the lock lever 52 rotates clockwise in FIG. 3. As a result, the open link 20 is brought into a substantially upright unlocked state as illustrated in FIG. 4 by the biasing force of the return spring (not illustrated). Similarly, when the actuator unit 53 or the lock cable 54 is locked, the lock lever 52 rotates counterclockwise in FIG. 3. As a result, the open link 20 rotates counterclockwise in FIG. 3 via the engagement piece 52*a* and enters a locked state inclined forward as illustrated in FIG. 5. In the present embodiment, as illustrated in FIGS. 8 to 14, a configuration including a lever body 21 and an inertia lever 22 is applied as the open link 20 described above. Note that, in the drawings, dots of different modes are applied to the lever body 21 and the inertia lever 22 for convenience.

The lever body 21 has the engagement hole 21*a* and a support shaft portion 21*b* at the lower end and has a lock engagement portion 21*c* at the upper end. The engagement hole 21*a* is a deformed hole penetrating along the left-right direction of the vehicle. The engagement end 33*a* of the open lever 33 located on the inner side of the vehicle is engaged with the engagement hole 21*a* in a state of being relatively rotatable but incapable of relatively moving in the vertical direction. The support shaft portion 21*b* has a columnar shape protruding from a portion adjacent to the engagement hole 21*a* towards the rear side of the vehicle. The lock engagement portion 21*c* is a protrusion protruding towards the outer side of the vehicle and is engaged with the engagement piece 52*a* of the lock lever 52 described above. That is, when the outside door handle or the inside door handle is opened, the lever body 21 moves upward via the open lever 33 and is disposed at the locked position inclined forward when the lock unit 50 or the lock cable 54 is locked and is disposed at the substantially upright unlocked position when the lock unit 50 or the lock cable 54 is unlocked. The locked position and the unlocked position of the lever body 21 correspond to the locked state and the unlocked state of the open link 20, respectively.

The inertia lever 22 has an inertia mass portion 22*a* at the upper end and a sliding hole 22*b* at the lower end. The inertia mass portion 22*a* is structured such that the mass of the upper end of the inertia lever 22 is larger than the mass of the lower end and has a pressing contact surface 22*c* at the upper end and a return inclined projection (return unit) 22*d* at a portion on the rear side of the vehicle. The inertia lever 22 is supported by the lever body 21 in a state where the support shaft portion 21*b* is inserted into the sliding hole 22*b*, whereby the inertia lever 22 can be rotated about the axis of the support shaft portion 21*b* and can be disposed in such a manner as to be inclined with the upper end located on the rear side and the lower end at the center.

A regulating plate 23 is provided on a protruding end surface of the support shaft portion 21*b*, and a torsion spring (a release biasing member and a shifting biasing member) 24 is provided at a portion of the support shaft portion 21*b* located between the lever body 21 and the inertia lever 22. The regulating plate 23 has a disk shape having an outer diameter larger than the inner diameter of the sliding hole 22*b* and is fixed to the end surface of the support shaft portion 21*b* with an attachment screw 25. The torsion spring 24 functions to bias the inertia lever 22 to rotate counterclockwise with respect to the lever body 21 as viewed from the rear side of the vehicle and to press the inertia lever 22 rearward with respect to the lever body 21, thereby tilting (shifting) the upper end of the inertia lever 22 rearward about the lower end.

Figure 11:
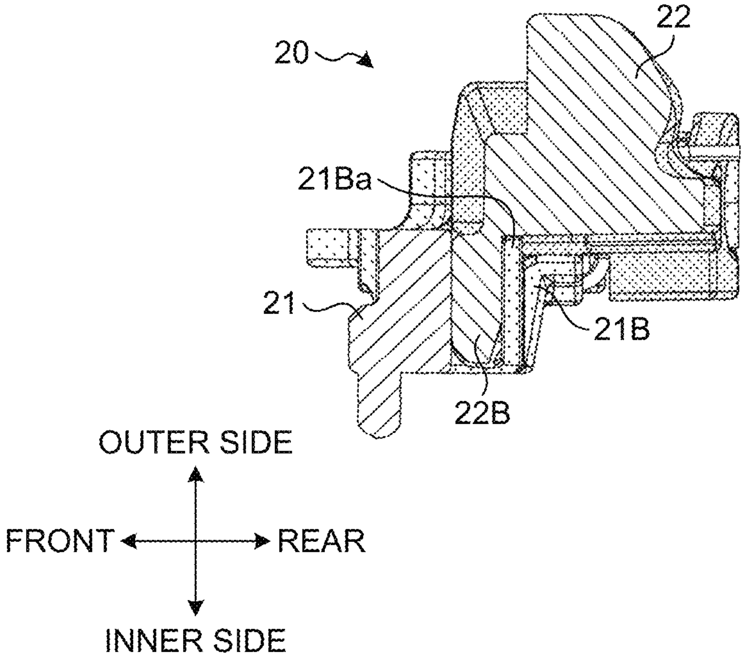
FIG. 11 is a cross-sectional plan view of the main part in the case where the inertia lever is at the operating position in the open link of the door latch device illustrated in FIG. 1.
Figure 12A:
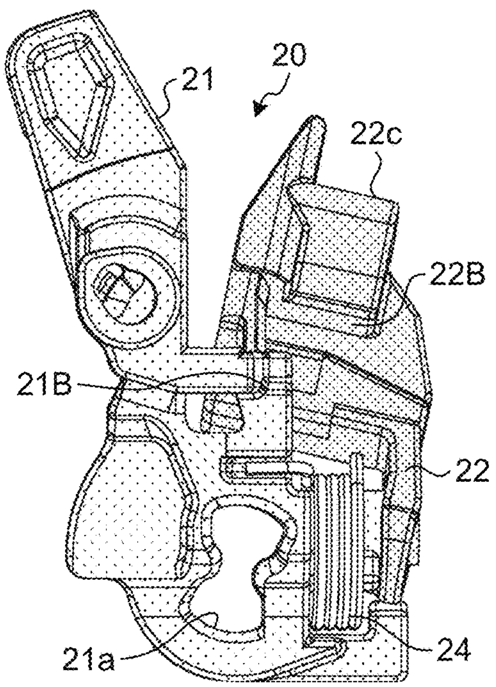
FIG. 12A is a diagram illustrating the case where the inertia lever is at the shift position in the open link of the door latch device illustrated in FIG. 1 as viewed from the inner side of the vehicle.
Figure 12B:
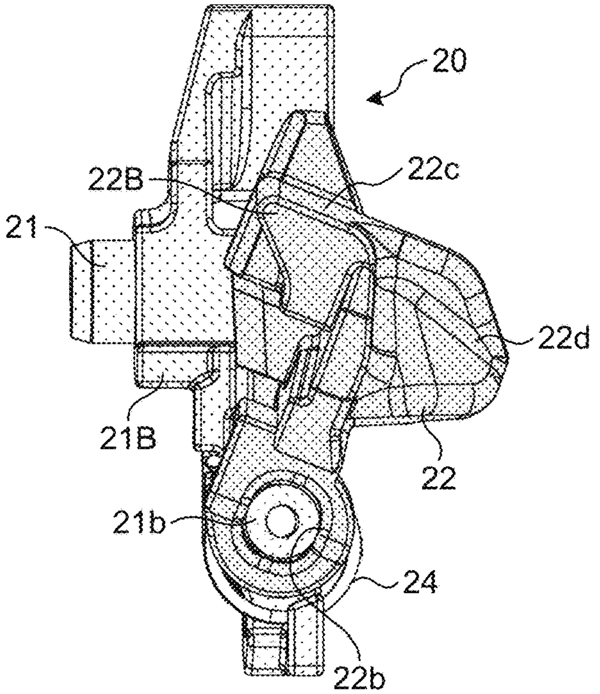
FIG. 12B is a diagram illustrating the case where the inertia lever is at the shift position in the open link of the door latch device illustrated in FIG. 1 as viewed from the rear side of the vehicle.
Figure 12C:
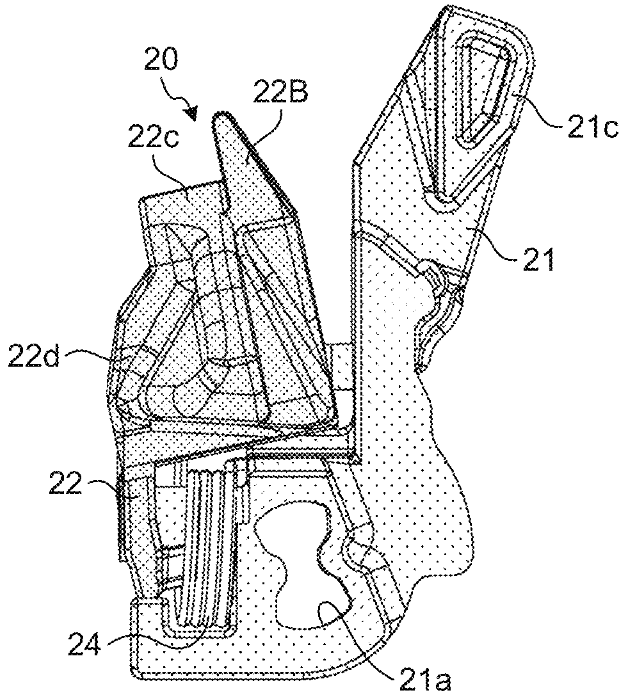
FIG. 12C is a diagram illustrating the case where the inertia lever is at the shift position in the open link of the door latch device illustrated in FIG. 1 as viewed from the outer side of the vehicle.
Figure 12D:
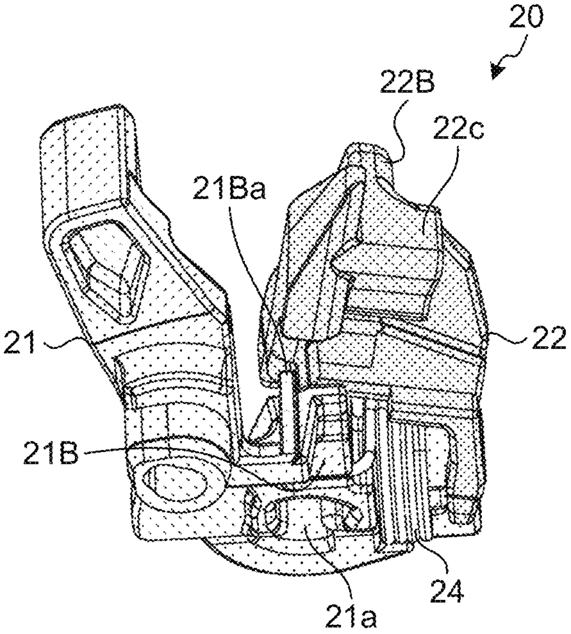
FIG. 12D is a perspective view illustrating the case where the inertia lever is at the shift position in the open link of the door latch device illustrated in FIG. 1 as viewed from the inner side of and from above the vehicle.
Figure 13:
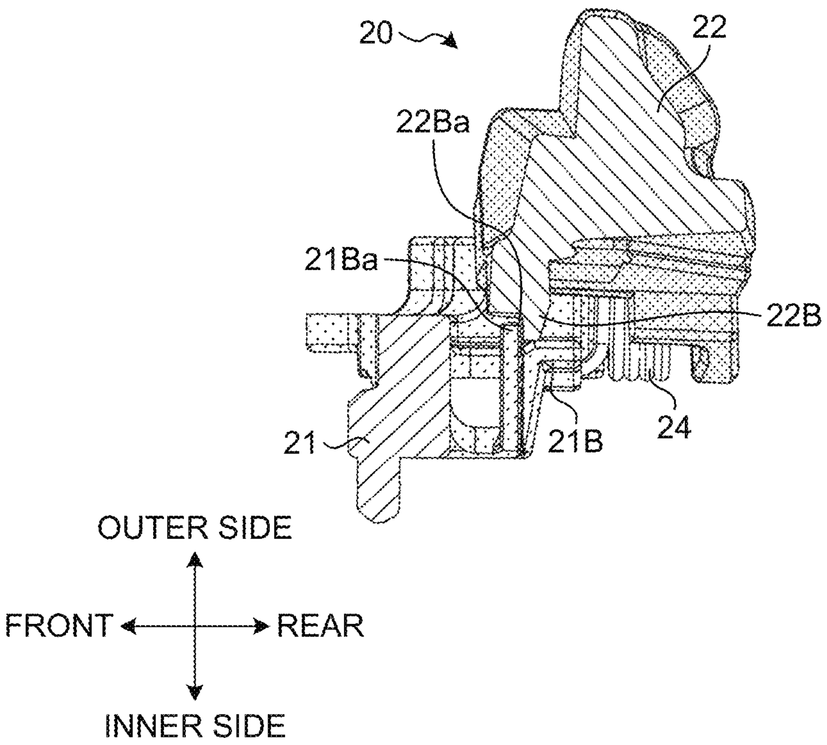
FIG. 13 is a cross-sectional plan view of the main part in the case where the inertia lever is at the shift position in the open link of the door latch device illustrated in FIG. 1.
Figure 14:
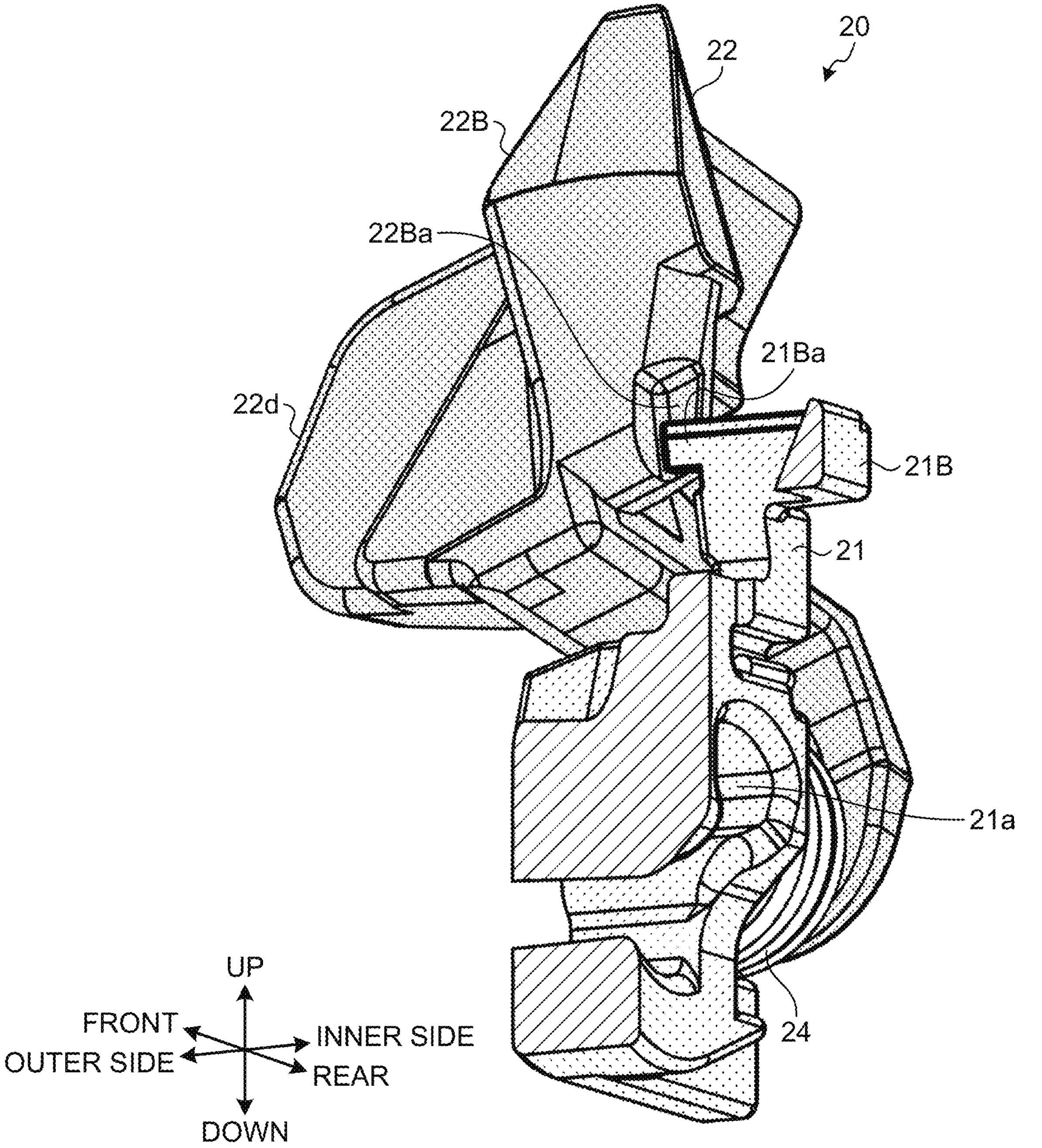
FIG. 14 is a side view of a cross section of the main part in the case where the inertia lever is at the shift position in the open link of the door latch device illustrated in FIG. 1.

The lever body 21 and the inertia lever 22 include block portions 21B and 22B, respectively. As illustrated in FIGS. 10 and 11, in a state where the axis of the sliding hole 22*b* is substantially parallel to the axis of the support shaft portion 21*b* and the inertia lever 22 is rotated counterclockwise with respect to the lever body 21 as viewed from the rear side of the vehicle by the biasing force of the torsion spring 24 in the rotation direction (at the operating position of the inertia lever 22), these block portions 21B and 22B are arranged side by side in the front-rear direction along the axis of the support shaft portion 21*b*. Meanwhile, as illustrated in FIGS. 12 to 14, in a state where the inertia lever 22 is rotated clockwise as viewed from the rear side of the vehicle with respect to the lever body 21 and the inertia mass portion 22*a* tilts backward, the block portions 21B and 22B face each other in the circumferential direction.

Furthermore, a regulating projection (regulating member) 21Ba and a regulating recess 22Ba are provided between the block portion 21B of the lever body 21 and the block portion (regulating member) 22B of the inertia lever 22. The regulating projection 21Ba protrudes from the upper end of the block portion 21B towards the outer side of the vehicle. The regulating recess 22Ba is a recess formed in a portion corresponding to the regulating projection 21Ba at the front end of the block portion 22B. The regulating projection 21Ba and the regulating recess 22Ba face each other when the inertia lever 22 tilts with respect to the lever body 21 and the inertia lever 22 rotates counterclockwise with respect to the lever body 21 as viewed from the rear side of the vehicle (at the shift position of the inertia lever 22) by the biasing force of the torsion spring 24 in the rotation direction and functions to prevent the inertia lever 22 from returning to the operating position with respect to the lever body 21.

Figure 15A:
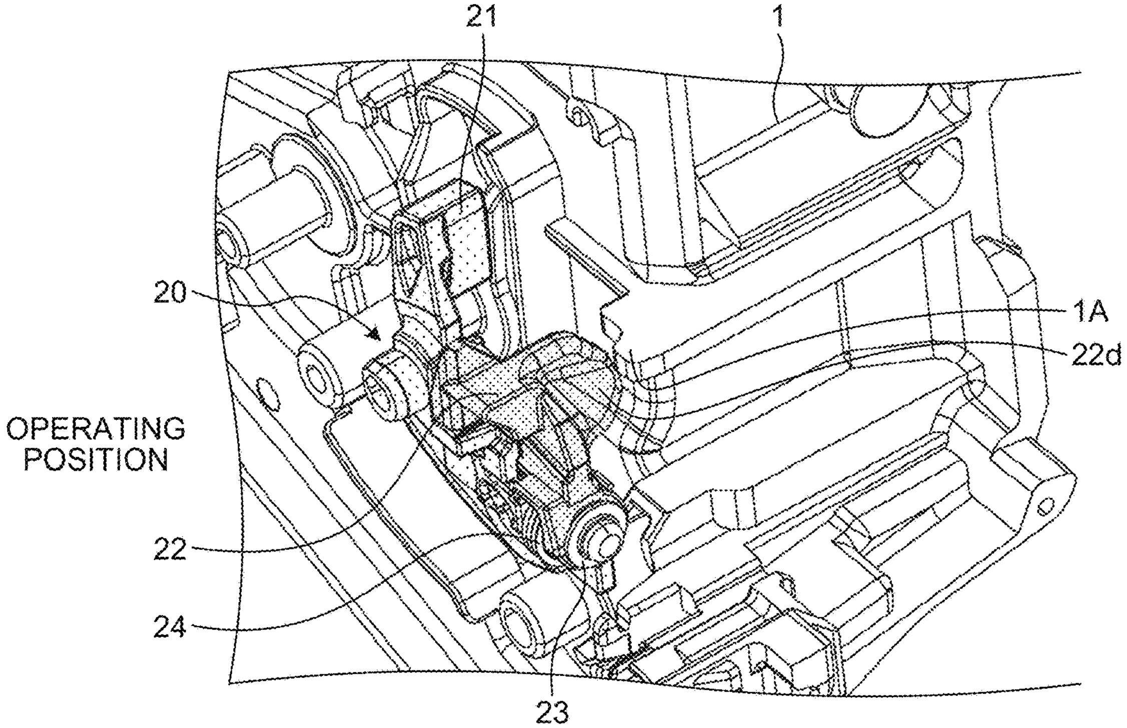
FIG. 15A is a perspective view illustrating a relative position between the open link of the door latch device illustrated in FIG. 1 and the housing and a state in which the inertia lever is disposed at an operating position.
Figure 15B:
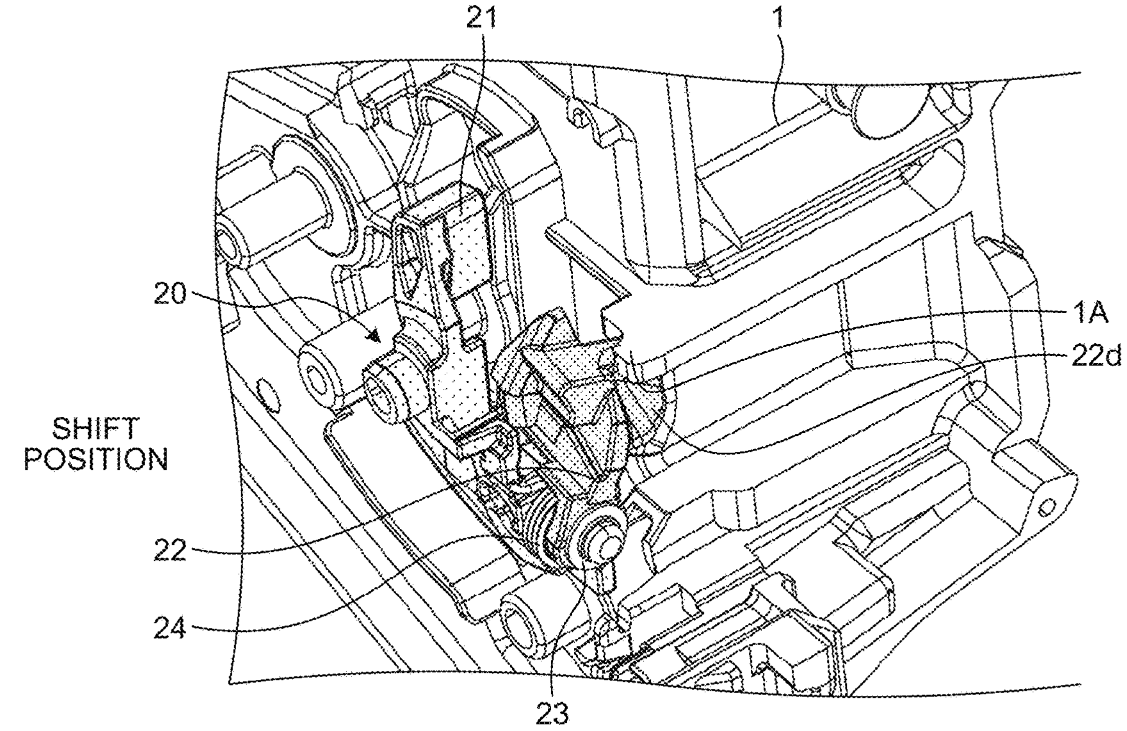
FIG. 15B is a perspective view illustrating a relative position between the open link of the door latch device illustrated in FIG. 1 and the housing and a state in which the inertia lever is disposed at the shift position.

When an opening operation of the outside door handle or an opening operation of the inside door handle is performed with a larger stroke amount for returning than usual in a state where the inertia lever 22 is disposed at the shift position, as illustrated in FIG. 15, the return inclined projection 22*d* comes into contact with a return projection (return unit) 1A of the housing 1, thereby moving the inertia lever 22 to the outer side of the vehicle with respect to the lever body 21 against the biasing force of the torsion spring 24 and then pressing the inertia lever 22 forward. That is, when the opening operation of the outside door handle or the opening operation of the inside door handle is performed with a larger stroke amount for returning than usual in a state where the inertia lever 22 is disposed at the shift position, the return inclined projection 22*d* abuts on the return projection 1A of the housing 1, whereby the inertia lever 22 moves to the outer side of the vehicle with respect to the lever body 21 and then moves forward to be located at the sensing position. As a result, the inertia lever 22 rotates counterclockwise as viewed from the rear side of the vehicle by the biasing force of the torsion spring 24 in the rotation direction and returns to the operating position described above. The return inclined projection 22*d* and the return projection 1A do not come into contact with each other and allow the open link 20 to move upward when the open link 20 is disposed at the operating position, and the return inclined projection 22*d* and the return projection 1A come into contact with each other only when the open link 20 moves upward in a state of being disposed at the shift position.

Figure 6A:
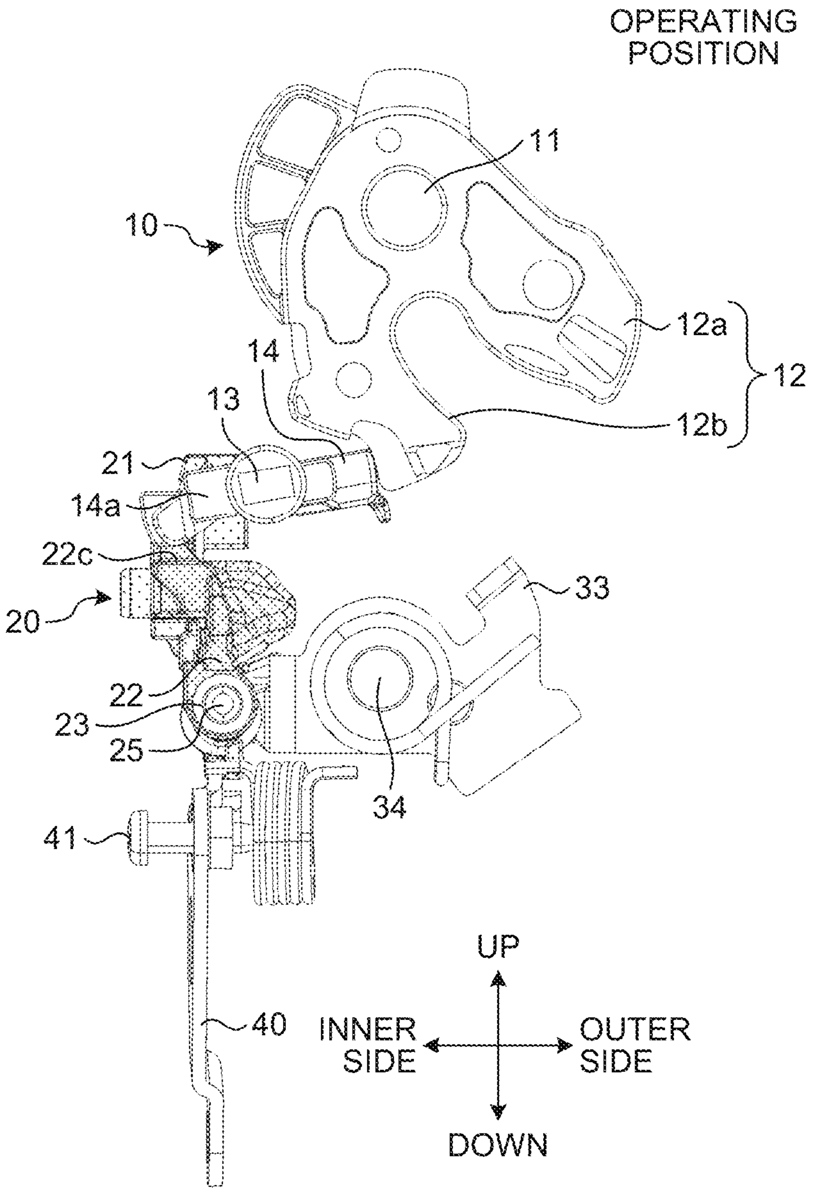
FIG. 6A is a diagram illustrating the main part of the internal structure when an inertia lever is at an operating position in an open link of the door latch device illustrated in FIG. 1 as viewed from the inner side of the vehicle.
Figure 6B:
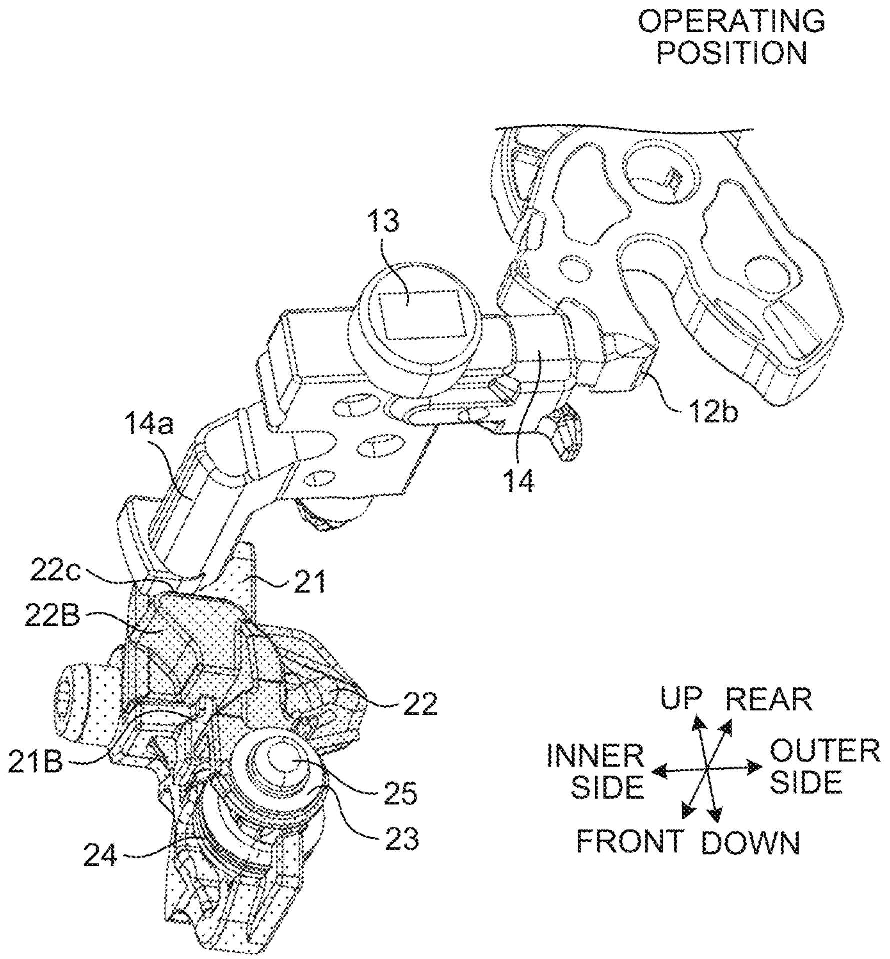
FIG. 6B is a perspective view illustrating the main part of the internal structure when the inertia lever is at the operating position in the open link of the door latch device illustrated in FIG. 1 as viewed obliquely from below.

The door latch device configured as described above is mounted on the vehicle in a state where the support shaft portion 21*b* of the lever body 21 extends along the front-rear direction of the vehicle and the inertia lever 22 is disposed at the operating position. In normal use, the inertia lever 22 is maintained at the operating position by the biasing force of the torsion spring 24 in the rotation direction. Therefore, as illustrated in FIG. 6, when the lever body 21 is disposed at the unlocked position, namely, when the open link 20 is in the unlocked state, the pressing contact surface 22*c* of the inertia lever 22 faces the lower surface of the ratchet lever 14*a*. As a result, when the lever body 21 moves upward by the opening operation of the outside door handle or the opening operation of the inside door handle, the ratchet lever 14*a* moves upward via the pressing contact surface 22*c*, whereby the engagement state of the ratchet 14 with the latch 12 is released, and the side door can be opened.

On the other hand, when the lock unit 50 or the lock cable 54 is locked, the lever body 21 and the inertia lever 22 integrally enter a locked state of being inclined forward, and the pressing contact surface 22*c* is disposed ahead of the ratchet lever 14*a*. Therefore, even when the lever body 21 moves upward by the opening operation of the outside door handle or the opening operation of the inside door handle, the inertia lever 22 does not come into contact with the ratchet lever 14*a*, the engagement state of the ratchet 14 with the latch 12 is maintained, and the side door remains closed with respect to the vehicle body.

Figure 7A:
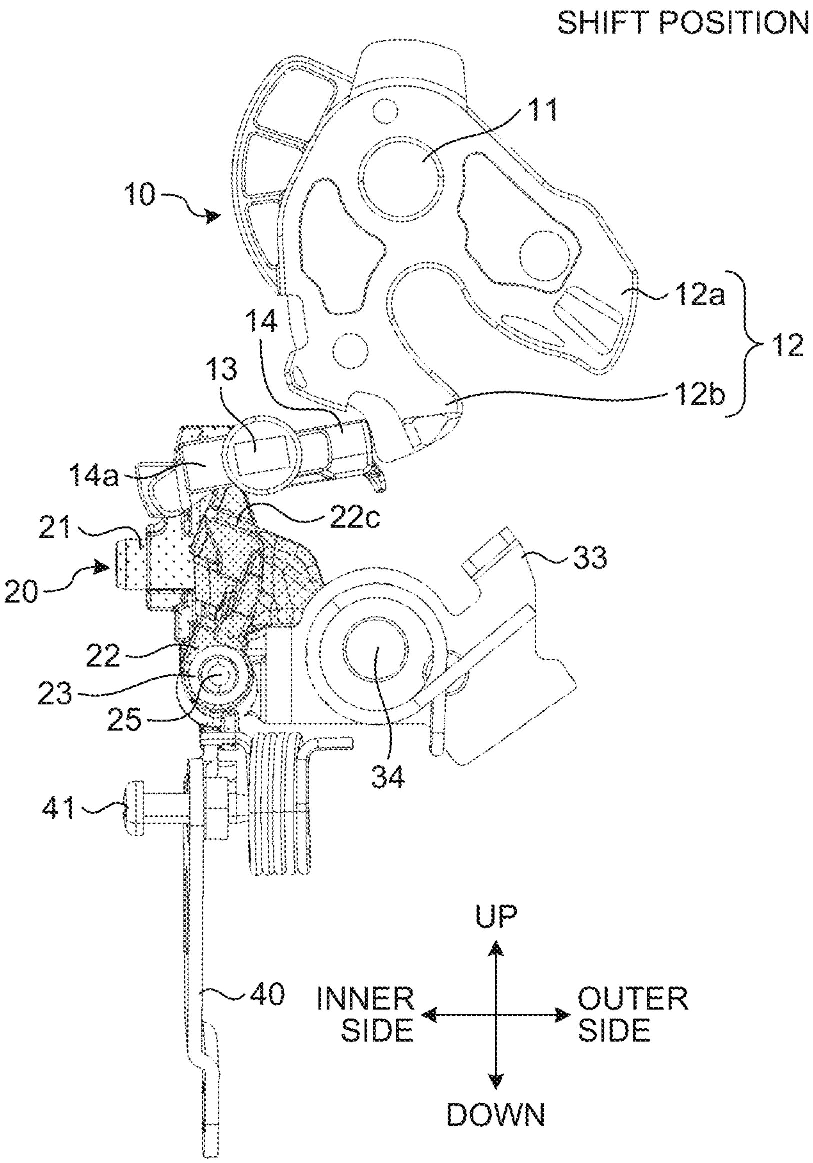
FIG. 7A is a diagram illustrating the main part of the internal structure when the inertia lever is at a shift position in the open link of the door latch device illustrated in FIG. 1 as viewed from the inner side of the vehicle.
Figure 7B:
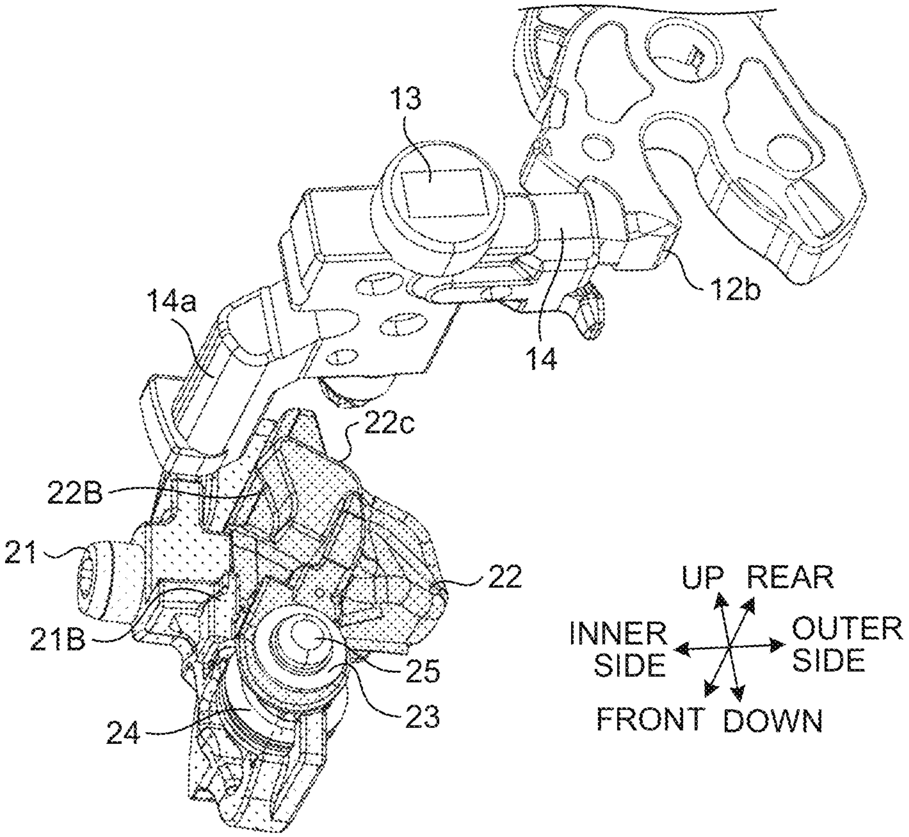
FIG. 7B is a perspective view illustrating the main part of the internal structure when the inertia lever is at the shift position in the open link of the door latch device illustrated in FIG. 1 as viewed obliquely from below.
Figure 8:
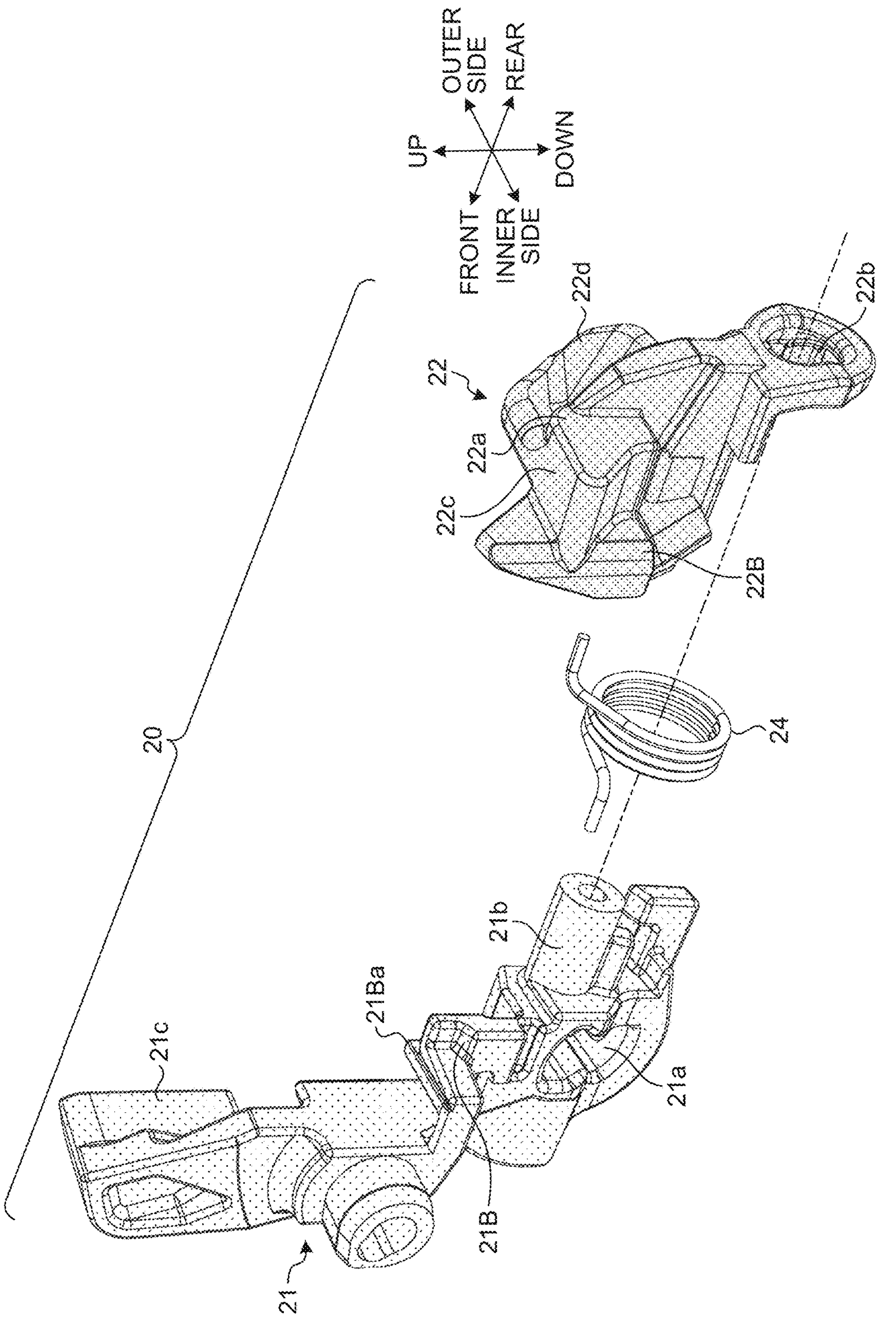
FIG. 8 is an exploded perspective view of the open link of the door latch device illustrated in FIG. 1 as viewed from the inner side of the vehicle.
Figure 9:
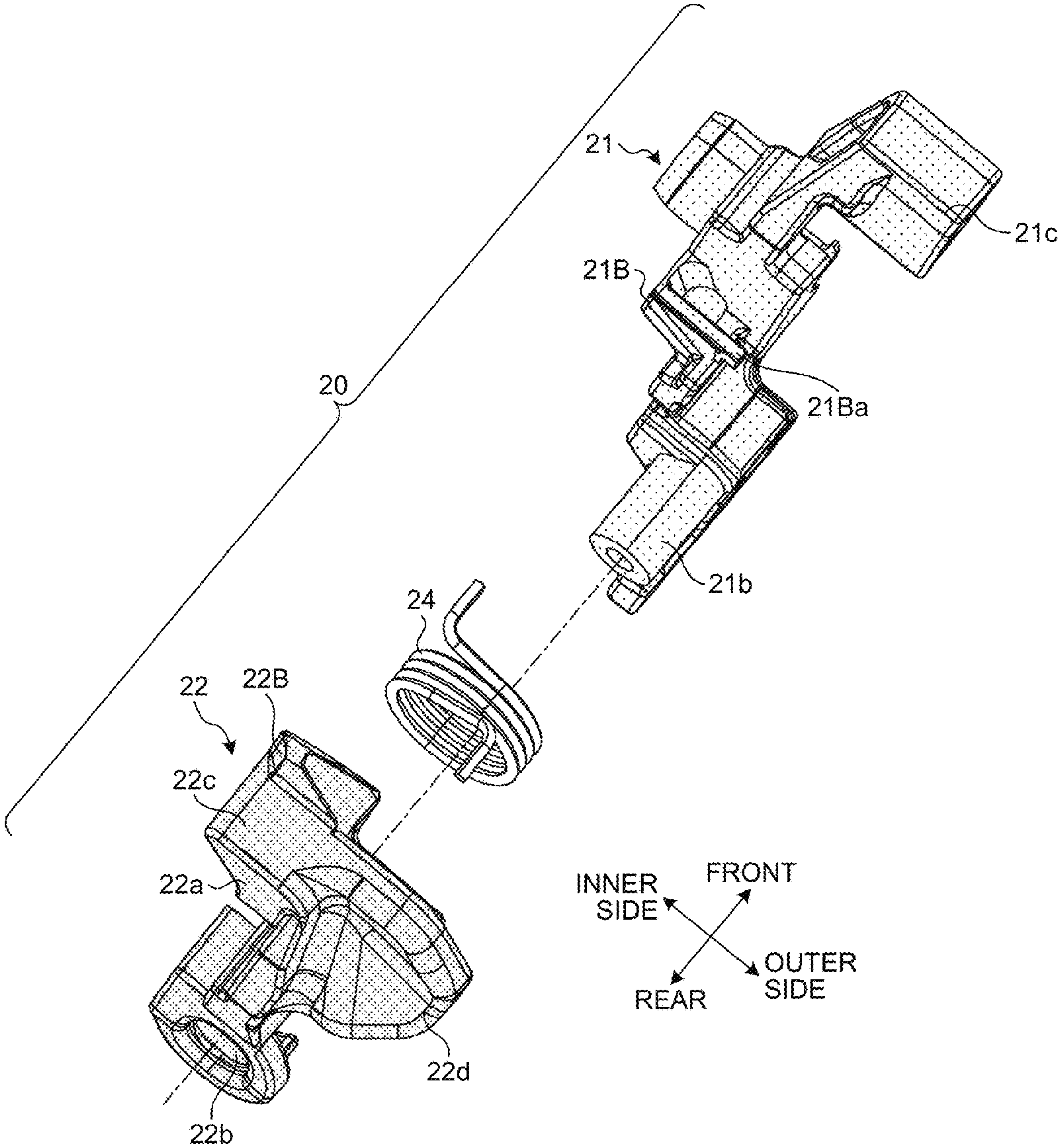
FIG. 9 is an exploded perspective view of the open link of the door latch device illustrated in FIG. 1 as viewed from above the vehicle.
Figure 10A:
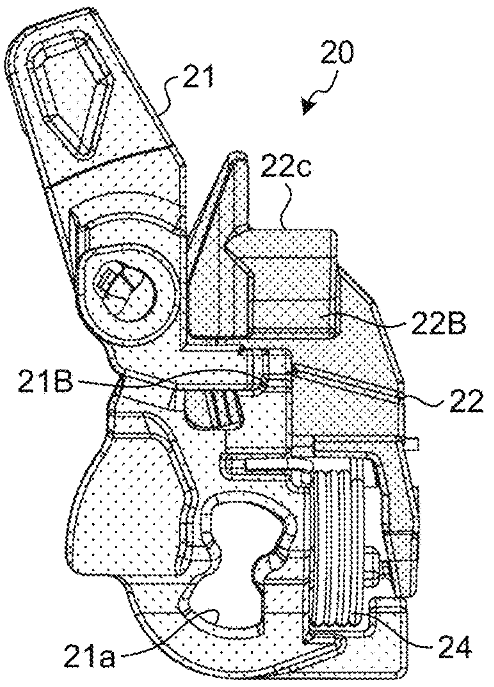
FIG. 10A is a diagram illustrating the case where the inertia lever is at the operating position in the open link of the door latch device illustrated in FIG. 1 as viewed from the inner side of the vehicle.
Figure 10B:
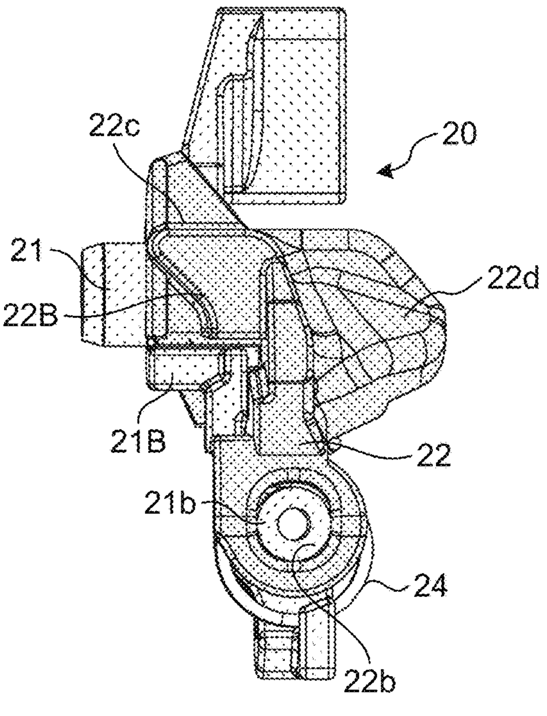
FIG. 10B is a diagram illustrating the case where the inertia lever is at the operating position in the open link of the door latch device illustrated in FIG. 1 as viewed from the rear side of the vehicle.
Figure 10C:
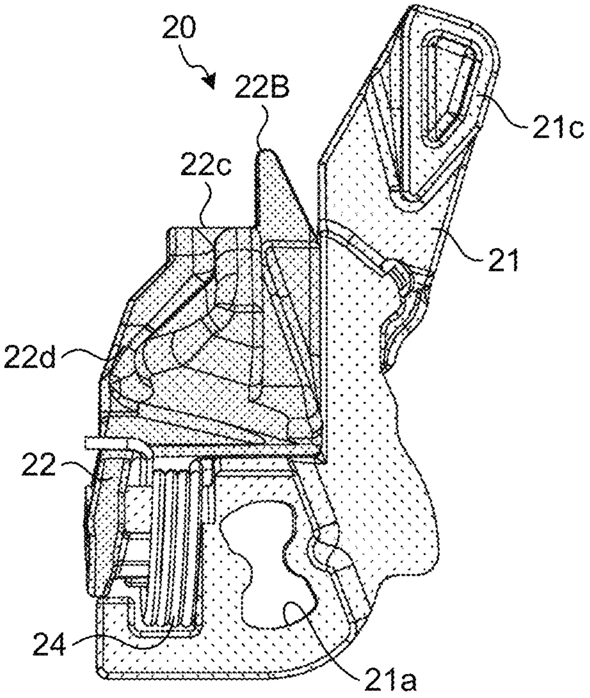
FIG. 10C is a diagram illustrating the case where the inertia lever is at the operating position in the open link of the door latch device illustrated in FIG. 1 as viewed from the outer side of the vehicle.
Figure 10D:
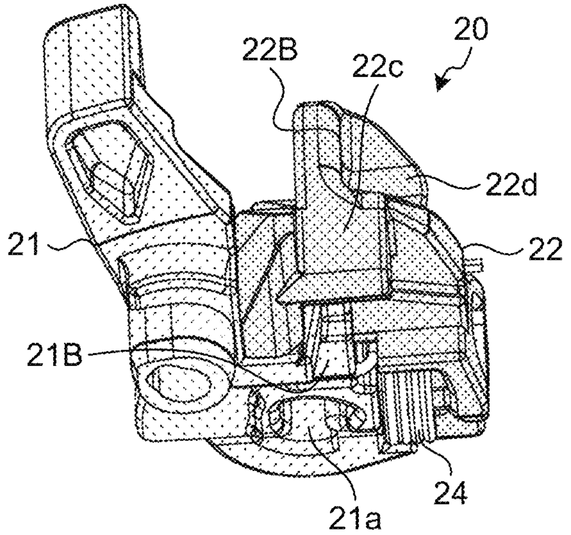
FIG. 10D is a perspective view illustrating the case where the inertia lever is at the operating position in the open link of the door latch device illustrated in FIG. 1 as viewed from the inner side of and from above the vehicle.

When an impact force in the left-right direction is applied to the above-described vehicle due to a side collision or the like and the inertia lever 22 having the upper end as the inertia mass portion 22*a* rotates against the biasing force in the rotation direction of the torsion spring 24 to an extent of moving beyond the regulating projection 21Ba and reaches the sensing position, the inertia lever 22 is disposed in such a manner as to be inclined with respect to the lever body 21 by the biasing force along the axial direction of the torsion spring 24 such that the inertia mass portion 22*a* is located on the rear side with the lower end as the center (shift position). As a result, the block portions 21B and 22B overlap each other in the circumferential direction, and the inertia lever 22 does not return to the operating position across the sensing position due to the biasing force in the rotation direction of the torsion spring 24. Therefore, as illustrated in FIG. 7, even in a case where the lever body 21 is disposed at the unlocked position, when the inertia lever 22 is disposed at the shift position, the pressing contact surface 22*c* at the upper end does not face the lower surface of the ratchet lever 14*a*. Accordingly, from this state, even when the lever body 21 moves upward by the opening operation of the outside door handle or the opening operation of the inside door handle, the pressing contact surface 22*c* does not abut on the ratchet lever 14*a*, the engagement state of the ratchet 14 with the latch 12 is maintained, and the side door remains closed.

Moreover, in this state, the inertia lever 22 rotates counterclockwise as viewed from the rear side of the vehicle by the biasing force of the torsion spring 24 in the rotation direction at the position where the block portion 22B moves beyond the regulating projection 21Ba, and the regulating recess 22Ba of the block portion 22B is maintained in a state of facing the regulating projection 21Ba, and thus the inertia mass portion 22*a* of the inertia lever 22 cannot move forward with respect to the lever body 21. That is, after the inertia lever 22 is disposed at the shift position with respect to the lever body 21, even if the outside door handle or the inside door handle moves due to the influence of the impact force applied to the vehicle body, the inertia lever 22 does not return to the operating position across the sensing position, and as a result, there is no possibility that the side door is unintentionally opened.

Note that although the door latch device mounted on the side door of the four-wheeled vehicle is described as an example in the above-described embodiment, the door latch device may be mounted on other types of vehicles. In this case, if the support shaft portion of the lever body is disposed in such a manner as to extend along the front-rear direction of the vehicle and that the inertial mass portion of the inertia lever is disposed above, as in the embodiment, it is possible to prevent the door from being unintentionally opened when an impact force is applied in the left-right direction of the vehicle due to a side collision or the like.

In the embodiment described above, the inertia lever 22 is tilted to shift to the shift position when the inertia lever 22 rotates to the sensing position with respect to the lever body 21; however, the present disclosure is not limited thereto. For example, it is possible to structure such that the inertia lever 22 shifts to the shift position by making the inertia lever 22 to slide along the axis of the support shaft portion 21*b*.

Furthermore, in the above-described embodiment, the single torsion spring 24 achieve both the function of biasing the inertia lever 22 in such a manner as to be maintained at the operating position with respect to the lever body 21 and the function of biasing the inertia lever 22 towards the sensing position; however, each of the functions may be achieved by separate biasing members.

Furthermore, in the above-described embodiment, the regulating projection 21Ba is provided in the lever body 21, but the regulating projection may be provided in the inertia lever 22, or the regulating projection may be provided in both the lever body 21 and the inertia lever 22.

REFERENCE SIGNS LIST

1 HOUSING
1A RETURN PROJECTION (RETURN UNIT)
12 LATCH
14 RATCHET
14*a* RATCHET LEVER
20 OPEN LINK
21 LEVER BODY

21B BLOCK PORTION
21Ba REGULATING PROJECTION (REGULATING MEMBER)
22 INERTIA LEVER
22B BLOCK PORTION (REGULATING MEMBER)
22*d* RETURN INCLINED PROJECTION (RETURN UNIT)
23 REGULATING PLATE
24 TORSION SPRING (RELEASE BIASING MEMBER, SHIFTING BIASING MEMBER)

The invention claimed is:

1. A door latch device comprising:

an open link that shifts between an unlocked state and a locked state and operates when a door handle is opened; and a ratchet lever that releases an engagement state of a ratchet with respect to a latch when an operation force is applied via the open link, so that, in the door latch device, the open link is capable of transmitting an operation force to the ratchet lever when the door handle is opened in the unlocked state, wherein the open link includes:

a lever body that is displaced to an unlocked position corresponding to the unlocked state and a locked position corresponding to the locked state and moves with an opening operation of the door handle;

an inertia lever that is movable to an operating position, a shift position, and an intermediate position that allows for movement between the operating position and the shift position, the inertia lever being movable to the intermediate position by relatively rotating with respect to the lever body about an axis; and at least one biasing member that biases the inertia lever in a rotation direction such that the inertia lever is maintained at the operating position with respect to the lever body, wherein the inertia lever is capable of transmitting an operating force to the ratchet lever only when the door handle is opened in a state where the lever body is disposed at the unlocked position and disposed at the operating position, and between the lever body and the inertia lever, the at least one biasing member shifts the inertia lever to a shift position with respect to the lever body in a movement mode different from and in a different plane than rotation that takes place when the inertia lever rotates to the intermediate position against a biasing force of the at least one biasing member, wherein regulating members prevent the inertia lever from moving from the shift position to the operating position without rotating to the intermediate position by facing to each other along the axis when the inertia lever is shifted to the shift position by the at least one biasing member.

2. The door latch device according to claim 1, wherein, between the lever body and the inertia lever, there are included block portions that are included side by side along the axis when the inertia lever is disposed at the operating position, the block portions facing each other in a circumferential direction around the axis when the inertia lever is shifted to the shift position by the at least one biasing member.

3. The door latch device according to claim 1, wherein the at least one biasing member biases the inertia lever in a tilting direction with respect to the lever body.

4. The door latch device according to claim 1, wherein the at least one biasing member is a torsion spring centered at the axis, the at least one biasing member is a single biasing member configured to both bias the inertia lever in the rotation direction and shift the inertia lever to the shift position with respect to the lever body in the movement mode different from the rotation.

5. The door latch device according to claim 1, wherein the inertia lever and a housing accommodating the inertia lever include an inertia lever return unit and a housing return unit respectively, wherein the inertia lever return unit and the housing return unit come into contact with each other and return the inertia lever to the operating position when the door handle is opened with a preset stroke amount for returning in a state where the inertia lever is shifted to the shift position.

* * * * *